(12) United States Patent
Pjanic et al.

(10) Patent No.: US 10,511,815 B1
(45) Date of Patent: Dec. 17, 2019

(54) OPTIMIZING EMISSIVE AND COLOR CHANGING PROJECTION SURFACES

(71) Applicant: Disney Enterprises, Inc., Burbank, CA (US)

(72) Inventors: Petar Pjanic, Schlieren (CH); Anselm Grundhöfer, Uster (CH); Morgane Gerardin, Rhône-Alpes (FR)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/042,907

(22) Filed: Jul. 23, 2018

(51) Int. Cl.
*H04N 9/31* (2006.01)
*G03B 21/60* (2014.01)
*G03B 21/56* (2006.01)
*G03B 21/20* (2006.01)

(52) U.S. Cl.
CPC ....... *H04N 9/3132* (2013.01); *G03B 21/2033* (2013.01); *G03B 21/567* (2013.01); *G03B 21/60* (2013.01)

(58) Field of Classification Search
CPC .... G03B 21/20; G03B 21/60; G03B 21/2033; G03B 21/567; G02F 1/01; G02F 1/31; H04N 9/3132
See application file for complete search history.

(56) References Cited

U.S. PATENT DOCUMENTS

2006/0132716 A1* 6/2006 Peeters .................. G03B 21/14
353/29
2016/0274447 A1* 9/2016 Grundhofer ......... G03B 21/606

* cited by examiner

*Primary Examiner* — Cara E Rakowski
*Assistant Examiner* — Danell L Owens
(74) *Attorney, Agent, or Firm* — Dorsey & Whitney LLP

(57) ABSTRACT

A method and system for optimizing projection surfaces for generating visible images. The projection system may include a projector that emits light in the ultraviolet range and a screen in optical communication with the projector. The screen includes a visible light absorbing layer, a transparent layer positioned over the visible light absorbing layer, and a plurality of fluorescent colorants printed on the transparent layer in a predetermined pattern, where the light emitted by the projector excites the fluorescent colorants to emit visible light forming the visible images. The predetermined pattern can be optimized to increase a color gamut of the formed images by varying surface coverage ratios of the fluorescent colorants.

12 Claims, 7 Drawing Sheets

OPTIMIZING EMISSIVE AND COLOR CHANGING PROJECTION SURFACES

TECHNICAL FIELD

The technology described herein relates generally to methods and systems for creating and optimizing projection surfaces and screens.

BACKGROUND

Projectors are used in a number of applications, ranging from cinema, to theme parks. In some instances, projectors are used to illuminate a particular surface to generate images (either a still image or multiple images forming a video). In many instances, a projector projects visible light onto a surface and the visible light reflects off of the surface to create the image. In these instances, the projected light typically matches the desired color of the image and this requirement can lead to constraints in hardware (e.g., projection speed, cost, etc.), and the light path of the light from the projector may be visible to a viewer. In dark environments and/or environments that include debris within the projection path (e.g., fog, dust, or the like), the projection path may be evident to a viewer and detract from the desired effect.

Additionally, in environments including ambient or other environmental illumination, the projected illumination may be modulated with the ambient illumination and depending on the surface reflection, the projected images may appear "washed out" with low contrast and poor coloring. This washed out effect may be increased with non-planar projection surfaces since light emitted from one area of the display may modulate light emitted from other areas. For example, in instances where the projection surface is non-planar (e.g., convexly curved, domed shape, etc.), light scattering from one surface area to another reduces the observed contrast of the display areas, even in a projection environment without ambient light.

SUMMARY

One example of the present disclosure is a method for utilizing a projector to generate one or more images on a screen. The method includes registering projector pixels emitted by the projector to the screen to determine a location of each projector pixel on the screen, where the screen comprises multiple pattern elements having at least two types of pattern elements; classifying the projector pixels based on the type of pattern element that the projector pixels illuminate; predicting an output color of an input image as projected on the screen by the projector based on the registration and classification of the projector pixels; utilizing the predicted output color of the input image, modifying at least one characteristic of the input image to generate a modified input image; and projecting the modified input image.

Another example of the present disclosure includes a method for optimizing a projection system for projecting light onto a screen. The method includes capturing a plurality of test images of a plurality of test patterns arranged on the screen and illuminated by an ultraviolet light projector; generating a model based on the test images to estimate spectral reflectance of the screen when illuminated by the ultraviolet light projector; interpolating the model to include interpolated patterns for the screen, where the interpolated patterns are different from the test patterns; and optimizing the model to determine an optimized pattern for the screen, wherein the optimized pattern includes a first color having a first coverage percentage, a second color having a second coverage percentage, and a third color having a third coverage percentage.

Yet another example of the present disclosure includes a method and system for optimizing projection surfaces for generating visible images. The projection system may include a projector that emits light in the ultraviolet range and a screen in optical communication with the projector. The screen includes a visible light absorbing layer, a transparent layer positioned over the visible light absorbing layer, and a plurality of fluorescent colorants printed on the transparent layer in a predetermined pattern, where the light emitted by the projector excites the fluorescent colorants to emit visible light forming the visible images. The predetermined pattern can be optimized to increase a color gamut of the formed images by varying surface coverage ratios of the fluorescent colorants.

SPECIFICATION

Figure 1:
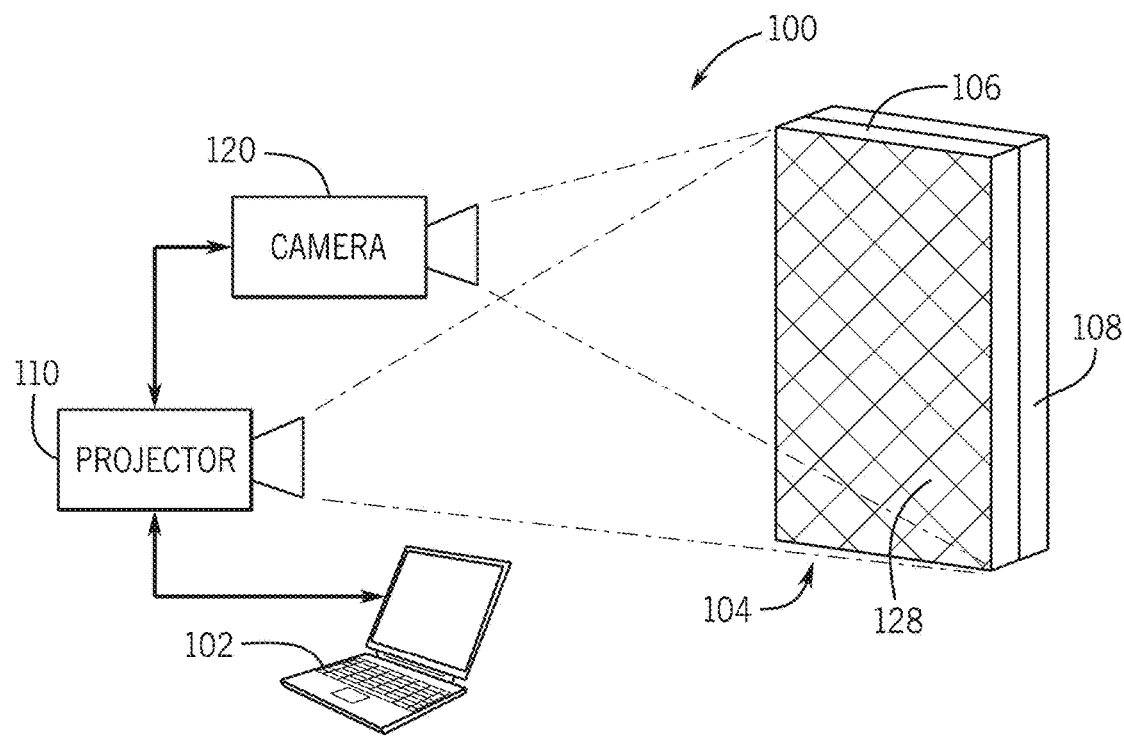
FIG. 1 is an isometric view of a display and optimization system.

The present disclosure is generally related to a method for creating and optimizing an emissive and/or color changing display for use within a projection system. The display is formed by a screen or surface including a plurality of emissive or reactive pattern elements. The pattern elements interact with projected light to generate a visible image. The projected light may be different color or wavelength from a light emitted or reflected from the pattern elements to generate the visible image.

In one example, the pattern elements are formed of ultraviolet inks or other ultraviolet elements printed on a screen in a selected pattern and orientation. The ultraviolet inks emit visible light colors (e.g., RGB) after absorbing light, such as ultraviolet wavelengths or a select ultraviolet wavelength. In this example, as the projector emits ultraviolet ("UV") light, the light hits the screen, interacting with the UV inks, causing the emission of visible light in one or more colors. The emission of the visible light forms a display image visible to a human viewer. In this example, the light path of the UV light from the projector to the screen is not apparent to a human viewer since humans cannot detect UV light. As such the display screen appears to be self-illuminated.

In another example, the pattern elements can be formed with visible RGB ink elements or other RGB elements, and the projector may emit visible light (e.g., a single channel white light). In this example, as the white light impacts the display screen, the RGB pattern elements form "colorants" for the surface as the white light is colored with the various colors impacted at each location due to the colors reflecting off of the surface at each location. In this example, constraints on the projector (e.g., hardware limitations, price) can be reduced since the coloring of the image may be formed separately from the light emitted by the projector, allowing a reduced cost projector or increasing a frame rate by trading spatial resolution for frame rate with a gray scale projector.

In both examples, the pattern elements can be arranged on the screen in different manners to optimize the desired formed image. In particular, the geometric configuration and location of the pattern elements, as well as the size and location, can be selected to generate different display features, reduce visible display artifacts, and increase the color gamut. For example, with certain UV inks, the red colorant may not emit as strongly or as efficiently as the green and blue colorants and so it may be desirable to increase the proportion of the red colorant as compared to other pattern element. This may allow an increased gamut as compared to similarly sized elements. In this manner, the pattern elements for a particular colorant can be increased or decreased to generate a desired image effect.

Additionally, it may be desirable to fill the entire display screen surface with pattern elements. Depending on the proportions of different colors, different geometric shapes may create a more desirable appearance. In some instances, the pattern elements may be shaped in rectangles or hexagons. In certain implementations, the geometric shape of the pattern elements or tiled elements may be selected based on visual appearance of the printed elements so as to reduce the visibility of the pattern by a viewer.

Using these techniques, the displayed or formed image may not be significantly affected by ambient light and/or variations in the surface topography, reducing the chance for the image to appear "washed out" and maintaining the desired contrast and coloring. For example, visible light reaching the display screen will be visually suppressed, reducing ambient illumination and UV pigments are not excited by visible light so any visible light from other display areas will not act to create an emissive effect on the screen, increasing contrast.

Figure 2:
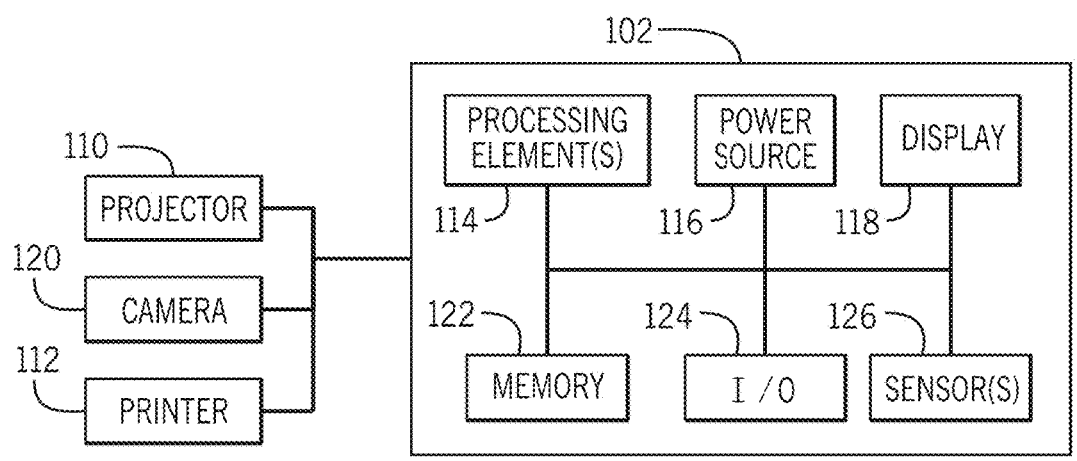
FIG. 2 is a block diagram of the system of FIG. 1.

The display system and optimization method will now be discussed in more detail. FIG. 1 is a perspective view of a display system 100 and FIG. 2 is a simplified block diagram of the display system of FIG. 1. The system 100 may include a computer 102, one or more projectors 110, one or more cameras 120, and a display screen 104 in optical communication with the projector 110 and optionally the camera 120. The projector 110 projects light onto the display screen 104, which then interacts with pattern elements on the screen 104 to generate images. The camera 120 and computer 102 may be used to calibrate and operate the projector 110.

The projector 110 is substantially any type of light emitting element. In some embodiments, the projector 110 may be selected to emit a select wavelength or group of wavelengths. In one embodiment, the projector 110 is a UV light projector that projects light in the UV range, e.g., 365 nm and in some instances may emit a single UV wavelength. In another embodiment, the projector 110 emits a combination of wavelengths to form a white light. The projector 110 may be a digital light processing projector, but any type of light emitting projector can be used.

The camera 120 is any device capable of capturing still or video images, e.g., a charge-coupled device camera or complimentary metal-oxide-semiconductor image sensor camera. In a specific implementation, the camera 120 is a digital single-lens reflex camera. The camera 120 typically captures full color images and/or monochromatic images, and may use any type of filter such as one or more color filters. In many instances the camera 120 is used to establish correspondences between pixels of the projector 110 and the display screen 104 (e.g., pixels or pattern areas). In these instances, the camera 120 is aligned with the projector 110 relative to the optical axis and focus. However, the alignment and relationship between the projector 110 and the camera 120 may be varied depending on the calibration used.

The display screen 104 or emissive display surface may be a surface or object and may include a single layer or multiple layers. The display screen 104 also includes a plurality of pattern elements or colorants 128 that are either formed or positioned on the display screen 104, e.g., printed via ink, adhered or the like. The pattern elements 128 generate the projected image or otherwise vary the characteristics of the projected to light to modify the projected image. In one embodiment, the display screen 104 is a white material, such as paper.

In another embodiment, the display screen 104 includes a transparent or pattern layer 106 and a backing layer 108. The transparent layer 106 includes the pigmented or pattern elements printed thereon and the backing layer 108 may be formed of an absorptive material, such as a black material, and the transparent layer 106 is connected or overlaid on the top of the absorptive material 108. In these instances, the backing layer 108 absorbs visible light, including environmental light and light passing around or through the pattern elements 128, increasing the quality by reducing degradation of the formed image. In this example, the absorptive layer reduces contrast loss due to ambient light, as well as reflected light from different parts of the display.

The pattern elements 128 may be formed of pigments having desired emissive or visible characteristics. In some embodiments, each projector pixel (e.g., light projection pixel) projected by the projector 110 may illuminate multiple pattern elements 128, rather than a 1:1 correspondence. In embodiments where the pattern elements 128 emit different colors, the multiple to one relationship between pattern elements 128 and the projector pixels 110 helps ensure that each projector pixel can correspond to multiple color portions. However, depending on the size and resolution of the pattern elements 128 and the pixels the correspondence may be varied and a 1:1 relationship could be used. In some embodiments, projector pixels may be grouped together in clusters depending on the corresponding pattern element 128 that they illuminate, which assists in the calibration discussed below.

Additionally, the pattern elements 128, which may be dots or other geometric shapes, define "colorants" for the formed image as they emit the desired colors for the formed image. In these instances, the pattern elements 128 may be arranged on the screen 104 based on the individual colors (e.g., red, green, and blue) or other appearance (black and white) that they emit. It should be noted that these different colors or different emission characteristics for various elements may be referred to as "types" of pattern elements.

The system 100 may also include a printer 112 that may be used to print the pattern elements on the display screen 104. The printer 112 may be any type of device that can print inks, such as UV inks, visible inks, or the like in a repeatable and controllable manner. For example the printer 112 may be a flatbed printer or a three-dimensional printer.

With reference to FIG. 2, the computer 102, which may include multiple computing devices, can be used to calibrate the projector 110, optimize the pattern elements 128, and/or operate the printer 112. In many instances, there may be a separate computer 102 for various operations and the structure and communication between devices, may vary based on different factors. The computer 102 includes one or more processing elements 114, a power source 116, a display 118, one or more memory components 122, an input/output interface 124, and optionally one or more sensors 126, each of which may be in communication with the other components, either directly or directly, via wired or wireless communication pathways.

The processing element 114 may be substantially any type of electronic device capable of processing, receiving, and/or transmitting instructions. For example, the processing element 114 may be a microprocessor or microcontroller. Additionally, it should be noted that select components of the computer 102 may be controlled by a first processor and other components may be controlled by a second processor, where the first and second processors may or may not be in communication with each other.

The memory 122 stores electronic data that is used by the computer 102 to store instructions for the processing element 114, as well as store presentation and/or calibration data for the system 100. For example, the memory 122 may store data or content, such as, but not limited to, audio files, video files, and so on, corresponding to various applications. The memory 122 may be, for example, magneto-optical storage, read only memory, random access memory, erasable programmable memory, flash memory, or a combination of one or more types of memory components.

A power source 116 provides power to the components of the computer 102 and may be a battery, power cord, or other element configured to transmit power to the various computer components.

The display 118 provides visual feedback to a user and, optionally, can act as an input element to enable a user to control, manipulate, and calibrate various components of the system 100. The display 118 may be any suitable display, such as a liquid crystal display, plasma display, organic light emitting diode display, and/or cathode ray tube display. In embodiments where the display 118 is used as an input, the display may include one or more touch or input sensors, such as capacitive touch sensors, resistive grid, or the like.

The I/O interface 124 provides communication to and from the projector 110, camera 120, and the computer 102, as well as other devices (e.g., other computers, auxiliary scene lighting, speakers, etc.). The I/O interface 124 can include one or more input buttons, a communication interface, such as WiFi, Ethernet, or the like, as well as other communication components, such as universal serial bus (USB) cables, or the like.

Optionally, the computer 102 may have sensors 126. The sensors 126 include substantially any device capable of sensing a change in a characteristic or parameter and producing an electrical signal. The sensors 126 may be used in conjunction with, or in place of the camera 120, or may be used to sense other parameters such as ambient lighting surrounding the display screen 104. The sensors 126 and display 118 of the computer 102 can be varied as desired to meet the needs of a particular application.

Figure 3:
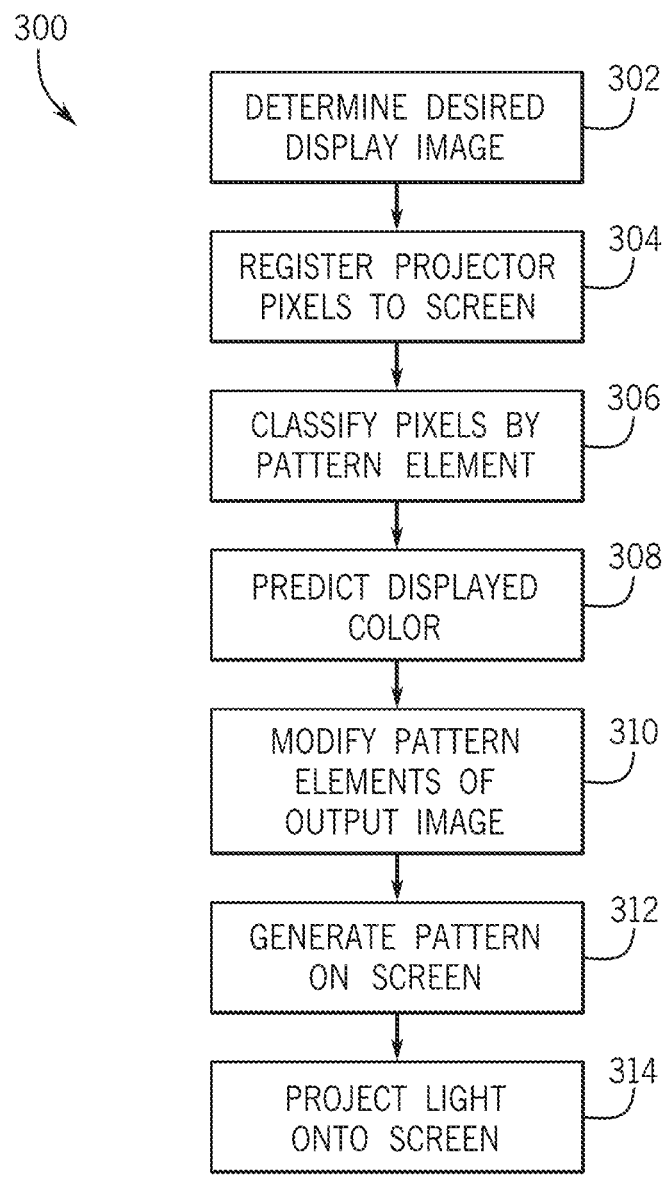
FIG. 3 is flow chart illustrating a method for forming images using the display and optimization system of FIG. 1.

FIG. 3 is a flow chart illustrating a method for forming images with the system 100. The method 300 may begin with operation 302 and a desired output or display image is determined. For example, a user may determine or generate an image or series of images to be displayed to a user via the display screen 104. The display image may be determined based on an input image from the memory component 122, another device, or the like. In many instances, the display image will include visible elements so as to be visible to a human viewer. The display image may include a single image or multiple images, e.g., frames of a video.

Once the image is determined, the method 300 may proceed to operation 304 and the projector 110 pixels are registered to the display screen 104. In some embodiments, a two-dimensional geometric registration and mapping using the camera 120 and projector 110 is used to establish a geometric mapping of corresponding projector 110 and camera 120 pixels. The geometric mapping enables warping of the desired target images to the projector 110 perspective and projector resolution. In these embodiments, the projected light is aligned with respect to the surface such that the optical axis and focus of the two devices are aligned, this may be done manually by a user or automatically via a focusing operation. The camera 120 is then aligned with the screen 104 such that the screen 104 is perpendicular to the optical axis of the camera 120 with a stopped down aperture to allow well-focused surface. Then, structured light patterns are projected to generate a geometric relationship between each individual pixel and camera pixel. For example, the structured light patterns have known pattern information such that images of the light on the projected surface can be captured and analyzed to determine the correspondence between pixels of the projector and the camera.

In some instances, the structured light may include binary, complementary gray code patterns in combination with thin, shifted lines, which after being projected and captured by the camera 120, are processed by the computer 102 to generate a dense mapping between corresponding pixels. The mapping can be stored in memory 122 as a per-projector-pixel lookup table that can warp captured camera 120 images onto the image plane of the projector 110. Individual pixels not reconstructed by the structured light process can be interpolated from the detected nearest neighbors using Delaunay triangulation and bilinear interpolation. The warped image, also called nodal image may then be computed in the native projector resolution. The nodal or warped image is the image of the scene as it would have been taken from a camera at the perspective of the projector.

Depending on the quality of the camera 120 and projector 110 optical elements (e.g., lenses) artifacts, such as chromatic aberrations might occur due to the varying wavelengths of the projected colors. In order to account for such artifacts a projection-camera mapping for each of the primary color can be done. For example, the structured light process is repeated for each projector channel individually and specific primary color lookup-tables, one for each channel, are generated.

It should be noted that although the structured light example is described, other calibration methods can be used in order to register the projector pixels to the display screen 104.

Once the geometric calibration is complete, the method 300 may proceed to operation 306 and the projector 110 pixels are classified based on the pattern element 128 or colorant that they illuminate. In words, a determination as to which pixels illuminate which specific pattern elements 128 on the display is made. In one example, display screen 104 is illuminated with a uniform, white projection light, and the result is captured by the camera 120. The captured image is warped to the point of view of the projector 110 using the individual per-color-channel lookup tables generated during operation 304. These nodal images then represent, for each projector color-channel, which pixel illuminates which colorant or pattern element 128 on the display screen 104. In many instances, all projector pixels may not be aligned to all pattern elements 128 and many pixels will hit one or more edges of one or more pattern elements 128 and illuminate several different pattern elements 128. In these instances, the nodal images represent averaged values of the colorants each pixel illuminates. To avoid possible issues (e.g., wrong classifications) that could be caused by vignetting (spatial darkening of the projection caused by lens imperfections), the nodal images can be normalized with a nodal image of a white image illuminating a uniform white surface.

Then, the projector pixels of the nodal images are grouped or classified depending on the specific colorants they illuminate. For example, for each nodal image a K-means algorithm is applied in CIELAB color space (e.g., a perceptually uniform color-spaced deduced from device independent color-space based on color matching function values). It should be noted that although CIELAB is discussed, other global color appearance models may be used. In instances where the projection surface may be illuminated by a single wavelength, e.g., 365 nm, the global color appearance model can be used to adequately characterize the colors.

Grouping pixels to a discrete number of primary colors significantly reduces the number of colors to classify. The minimal number for a K cluster value may be equal to the number of colorants, e.g., for black and white pattern elements Kmin=2, for primary color pattern elements Kmin=3. Specifying K as a higher number provides additional information and control over the projection, because it separates pixels that illuminate several colorants. However, raising the number of K also increases the complexity of the optimization function required to estimate the projection intensities, which makes it more difficult to converge. Furthermore, noise may be introduced, because the same color may be achieved with multiple solutions. It should be noted that the above method of clustering pixels with types or colors of pattern elements is just one method that may be used.

Once the pixels of the projector 110 are grouped or otherwise identified as corresponding to select types of pattern elements 128, the method 300 may proceed to operation 308 and a color prediction model is used to predict the displayed color of the screen 104 when illuminated with a predetermined light arrangement by the projector 110. For example, the color prediction model estimates the reflectance of the observed color in function of the different intensities of light illuminating the clusters.

In one example, utilizing the clusters deduced using the K-means algorithm, a color-prediction model can be constructed, that allows prediction of the reflected color of the display screen 104 depending on the projected intensities, i.e., the reflected color is predicted as a modulation of projected light illuminating the clusters. In this example, the number of illumination channels (i.e. projector color) can be three rgb colors and/or can contain a monochrome light or any other number of channels. In some instances a spectral approach using measurements captured by a spectrophotometer can be used as the color model and in others an image-based approach using the camera 120 to acquire the required data can be used.

With the spectral approach, the pixels are classified according to the colorant or pattern element 128 type that they illuminate. Often, the type of clusters or colorants is limited and they may be arranged in a high-frequency pattern, such that the contribution from each of the clusters to the overall observed color is additive as described by Eq. (1) below.

$$R(\lambda) = \sum_{i=1}^{K} R_i(\lambda) \qquad (1)$$

In Eq. (1), $R(\lambda)$ is the overall reflectance of the screen surface illuminated by the projector 110, $R_i(\lambda)$ is the reflectance contribution of the i-th cluster and K is the number of clusters.

The color reflected from the each of the clusters $R_i(\lambda)$ is formed by illuminating cluster (i) with the projector 110. To model $R_i(\Delta)$, the potentially non-linear response functions of the projector channels should be accurately measured and taken into account. Various algorithms exist to model the function ranging from simple gamma curves to poly-harmonic spline mappings considering internal color processing, e.g., color mapping and black level boosting. In one implementation, complex processing leading to input-dependent color-mixing within the projector 110 was disabled to allow a less complicated model. However more complex models accounting for such internal color processing within the projector 110 can be used as well. The j response curve functions $f_j$, for each projector color channel, are obtained by measuring the projected colors for a dense set of intensities. Then, the responses are approximated by an interpolation function. The shape of the curves depends on the projector used.

To establish a model for $R_i(\lambda)$, the projector 110 is activated to project colors at full intensity in the areas of the i-th cluster and the spectral response is measured with a spectrophotometer $R_{j,i}^{fi}$. Assuming that no projector-internal color processing occurs, $R_i(\lambda)$ can be determined as a weighted sum of the projected colors at full intensity, projected only onto the i-th cluster. The weights $f_j(P_{j,i})$ are obtained by applying the response function onto the input intensity values as expressed by Eq. (2) below.

$$R_i(\lambda) = \sum_{j=1}^{N} f_j(P_{j,i}) \cdot R_{j,i}^{fi}(\lambda) \qquad (2)$$

In Eq. (2), $R_i(\lambda)$ is the reflectance of the i-th cluster illuminated with the projector 110, $R_{j,i}^{fi}(\lambda)$ is the reflectance of the j-th projector color at full intensity projected only onto the i-th cluster, $f_j$ is the response function for the j-th projector color channel, $P_{j,i}$ are input intensities for the j-th projector color channel projected only onto the i-th cluster, and N is the number of projector color channels.

Often, the spectrophotometer is set up to capture the reflectance of a specific surface area covering multiples of all clusters, hence capturing the light that is spilled from one cluster to the another, which helps to build an accurate spectral-prediction model.

Finally, Eq. (2) with Eq. (1) is combined together, resulting in Eq. (3):

$$R(\lambda) = \sum_{i=1}^{K} \sum_{j=1}^{N} f_j(P_{j,i}) \cdot R_{j,i}^{fi}(\lambda) \quad (3)$$

Eq. (3), provides a prediction of an observed color of the screen 104 as a function of input intensities $P_{j,i}$, i.e., how much of the j-th projector color is illuminating the i-th cluster. The final observed color is calculated as a weighted sum of all of the projection colors illuminating all clusters.

The predicted spectral reflectance can then be converted to CIELAB device-independent color-space. The CIELAB colors are calculated by first converting the predicted spectra to the CIE-XYZ color space for the CIE 1931 Standard Observer and then, the CIE-XYZ coordinates are converted to the CIELAB space by selecting the full-white projection illuminating the white surface as a white reference point. The full-white projection can be used as a white reference point, because it is the strongest stimulus in this example.

Another color prediction model approach is the image based approach. This embodiment does not require spectrophotometer (as the spectral approach) and with the image based approach, modeling is not limited to single, or several, spatial measurements that may capture only a limited area of the projection.

With this approach, the camera 110 captures per-pixel information that then can be used to predict the reflected color for each individual projector pixel (x, y). This approach accounts for spatial artifacts resulting from lens vignetting, light falloff, and spatially varying defocus. In one embodiment, the camera 120 captures images of all the illumination channels of the projector 110 projected onto all clusters at full intensity. Then, the corresponding nodal images $R_{j,i}^{fi}(x, y)$ are calculated where the nodal images define the reflected r, g, b values for each projector pixel (x, y), for each color at full intensity j and for each cluster i. In some instances, it may be assumed that the contribution of neighboring high-frequency clusters is additive, which may true for only small spatial areas. Therefore, in some instances, a Gaussian blur is applied to the nodal images $R_{j,i}^{fi}(x, y)$. The size of the kernel should be large enough to spread the information between clusters, but will depend on the projector resolution and size of the pattern elements 128. A standard sRGB to CIE-XYZ conversion for D65 illumination is applied to convert the blurred nodal images to CIE-XYZ color space. Other conversions, such as for AdobeRGB or a device-dependent calibration can be used as well.

Finally, similar to Eq. (3) a color-prediction function is defined to predict per-pixel CIE-XYZ color values in function of the input intensities resulting in Eq. (4):

$$R(x, y) = \sum_{i=1}^{K} \sum_{j=1}^{N} f_j(P_{j,i}) \cdot R_{j,i}^{fi}(x, y) \quad (4)$$

In Eq. (4), R(x, y) is the predicted CIE-XYZ color for the projector pixel (x, y), and $R_{j,i}^{fi}(x, y)$ is the CIE-XYZ color of the j-th projector color at full intensity illuminating only the i-th cluster at pixel position (x, y). The image based approach may require less expensive hardware as compared to the spectral approach and may better account for spatial artifacts, but may have more limited color precision during acquisition and conversion.

Returning to FIG. 3, once the color prediction model is generated that allows a estimation of the spectral reflectance for given images, the method 300 proceeds to operation 310 and the input image and/or the display screen 104 may be modified completed to ensure a desired display image. For example, depending on the predicted color, the input image may be adjusted, such as by changing the chroma, hue, intensity, or the like, in order to create a desired input image. In instances where a single projection color or wavelength is used, the projection intensities of the projector pixels can be modified to generate a mixture of fluorescent emissions that reproduce colors that appear as closely as possible to the desired ones. Additionally or alternatively, the pattern elements 128 may be adjusted in size, shape, orientation, and/or position to achieve a desired appearance. As specific method for optimizing the pattern elements 128 is discussed with reference to FIG. 4. In some instances, an iterative approach may be used to determine the desired color.

In one example of an optimization function that may be used to determine a desired or optimal input image intensities or the characteristics of the projector 110 done by minimizing the square sum of two differences shown in Eq. (5) below:

$$P_{j,i}^{Opt} = \operatorname{argmin}((\Delta E_{00}^*(Lab_{TrgP}, Lab_P(P_{j,i})))^2 + (\Delta E_{00}^* (Lab_{TrgW}, Lab_W(P_{j,i})))^2) \quad (5)$$

In Eq. (5), $Lab_{TrgP}$ is the target CIELAB color that we want to observe on the pattern, $Lab_{TrgW}$ the target CIELAB color that should be observed on a white surface, $P_{j,i}^{Opt}$ are the optimal intensities that, when projected, produce, as close as possible, the desired color changes. $Lab_w(P_{j,i})$ is a CIELAB color observed on the white surface of the optimal projections $P_{j,i}$, and $Lab_p(P_{j,i})$ is the CIELAB color observed on the pattern surface of the optimal projections. $Lab_w(P_{j,i})$ and $Lab_p(P_{j,i})$ are calculated by first estimating the reflectance using the color-prediction model and converting these values to CIELAB color space.

Further, to determine the projection image, the input images can be transformed to the projector image plane, and the colors converted from their input space (sRGB or AdobeRGB, etc.) to CIELAB color space and gamut mapped to the dedicated sub-gamut, enabling the desired color-change. Then, for each pixel coordinate, the gamut-mapped values as target colors as in Eq. (5) can be used to estimate $P_{j,i}^{Opt}$. These values describe how much of the j-th illumination channel should be projected onto the i-th cluster. This implies that each pixel illuminates all clusters in the same area. Because, however, each pixel only illuminates one specific cluster, further processing may be desired.

As one example of the further processing, n m projector pixels can be merged into a uniformly colored one, ensuring that all clusters are illuminated. The optimal projections may then be calculated for this subset of combined pixel values. Now, each combined pixel illuminates all clusters, ensuring that the color-changing effect will be correctly reproduced, regardless of the image content. However, because this approach combines multiple pixels into one it may significantly reduce the image resolution. To overcome this limitation, another approach can be used, where $P_{j,i}^{Opt}(x, y)$ is computed independently for each original projection pixel. The final image is then assembled by applying simplified dithering to the optimized values. Dithering, in this context, relates to a method to apply spatial thresholding that preserves the overall image appearance. If pixel (x, y) is classified to the i-th cluster, only the optimal values from that cluster are assigned to it, and all other colorant values are discarded as shown in Eq. (6) below.

$$P_j^{Fin}(x, y) = \sum_{i=1}^{K} \delta_i(x, y) \cdot P_{j,i}^{Opt}(x, y) \quad (6)$$

$$\delta_i x, y = \begin{cases} 1; (x, y) \in C_i \\ 0; (x, y) \notin C_i \end{cases}$$

In Eq. (6), $P_j^{Fin}(x, y)$ is the final intensity for the pixel position (x, y) and for the j-th color channel, and Ci is i-th cluster. The benefit of this simplified dithering approach is that it generates images in native projector resolution, preserving high-frequency details. This approach relies on the fact that the colorants are small and arranged in a high-frequency pattern, implying that, on average, it correctly creates the color-changing effect. In contrast to the previously mentioned pixel-combining approach, the simplified dithering does not guarantee that the color-changing effect will always be perfectly reproduced on each pixel, but it preserves the original image's resolution much better with its high-frequency content.

Once the input image, projection intensities, and/or pattern elements 128 are modified in operation 310, the method 300 may proceed to operation 312. In operation 312, the projector 110 is activated to directed light towards the screen 104. As the light impacts the screen 104, the light interacts with the pattern elements 128 so as to form the display image. In instances where the projector 110 is a UV projector, the UV radiation is absorbed by the pattern elements 128, exciting the pattern element 128 to emit visible light in a select wavelength range (e.g., red light, blue light, green light). The combination of the emitted light from all of the pattern elements 128 forms the display image. In this example, a human viewer may see the screen 104 as a self-illuminating or emissive display since the projection path of the UV light from the projector 110 to the screen 104 may not be visible since the light is UV and only the emitted visible light is viewable.

In instances where the projector 110 emits visible light, such as a white light or a select colored light (e.g., red, blue, green), as the light hits the pattern elements 128, the pattern elements 128 absorb the projected light and the different colorants or types of pigments may absorb the light differently, causing a modified display image from the input image. For example, if a highly saturated red color is projected onto all pigment elements 128, some of the colorants will absorb the red and some will reflect the red, causing an overall color change from the projected image.

In some instances, the system 100 can be used to create color change effects by positioning different screens within the same projected light or input image. For example, a plain white screen may be positioned in front of the patterned screen 104 during the projection of the input image. In this example, the viewer will see a color change effect as the influence or emissions of the pattern elements 128 on the input light will be removed and depending the colorants used for the pattern elements 128 can generate different color changing effects. For example, with a black and white colored pattern screen 104, when a highly saturated red color is projected onto the black pattern elements 128 a low saturated blue color is projected onto remaining white elements 128 (or white spaces) the majority of the projected red color will be absorbed by the black pigment, resulting in an overall blueish surface appearance. When the same input image intensities are projected onto a uniform white surface (e.g., a white surface is positioned in front of the pattern screen), the red projection is no longer absorbed by the black pigment and because the red projection has a higher saturation compared to the blue projection, an overall reddish surface appearance is perceived, i.e., when the strong red and weak blue colors are projected in a high-frequency arrangement, the human eye averages these projected colors in the local neighborhood, and a reddish color tone is observed.

In examples where the screen 104 includes the absorptive layer 108 and 365 nm wavelength light is used as the projection light, the contrast may be increased as compared to other displays, even in non-planar configurations (e.g., convexly or arbitrarily shaped displays or in environments with significant reflectance or ambient illumination). In particular, the absorption layer 108 suppresses visible light and only the 365 nm UV illumination generate visible colors using the emissive pigments. The undesired ambient illumination is significantly reduced due being absorbed by the layer 108. Further, visible light scattering from UV pigments on one side of the display will not substantially effect UV pigments on the other sides of the display, since UV pigments will not be excited by the visible light emitted from other pigments and most of the incoming light will pass through the transparent sheet to be absorbed by layer 108.

A specific example for optimizing the pattern elements 128 or other pigmented elements on the screen 104 will now be discussed. For example, in instances where each of the rgb UV inks may not have same emissive efficiency as one another (e.g., the red UV ink is less efficient and produces a lower intensity of visible light as compared to blue or green inks), the pattern or tile elements may be modified to account for this discrepancy. By optimizing the pattern based on emissive characteristics, a wide color gamut can be determined for the system 100, while also minimizing the overall size of each pattern element to reduce visibility of the spatial arrangement to a viewer.

Figure 4:
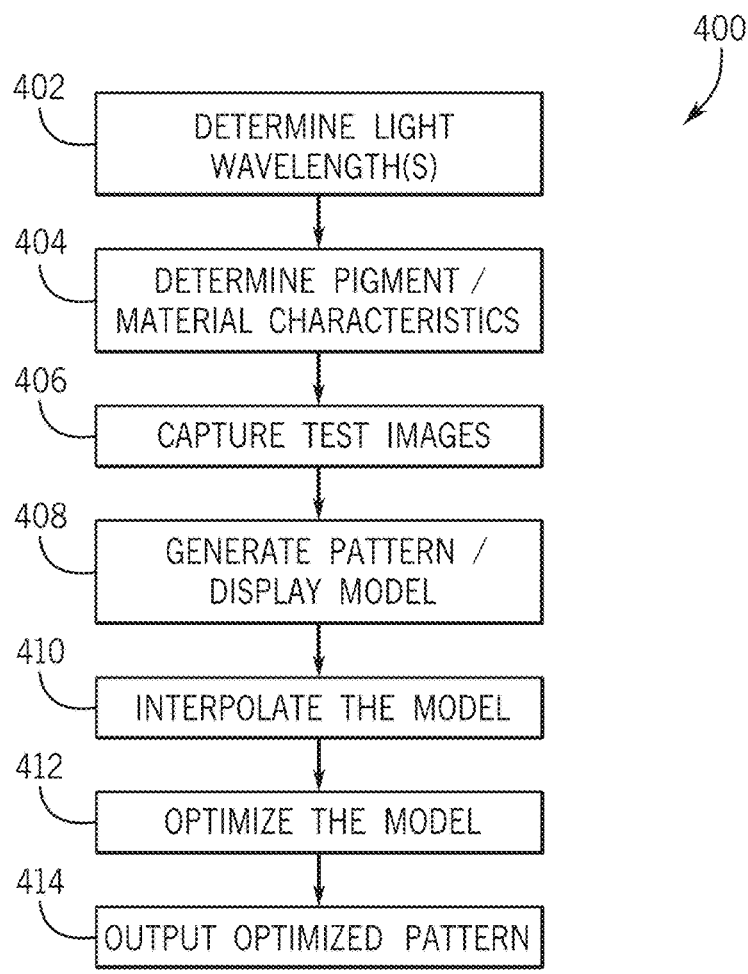
FIG. 4 is a flow chart illustrating a method for optimizing pigment elements on a projection screen for use with the system of FIG. 1.

FIG. 4 is a flow chart illustrating a method 400 for optimizing the pattern elements 128 to achieve an increased color gamut for the displayed image. The method 400 may begin with operation 402 and the desired light wavelengths for illuminating the screen 104 are selected. In particular, a user may determine the desired coloring effects or UV emission of the system 100. Once the desired light for the projector 110 is selected and/or in combination with the determination, the method 400 proceeds to operation 404 and the screen 104 materials are determined. For example, depending on the desired display image and environment, the types of pigment for the pattern elements are selected (e.g., the type of colors to emitted, absorbed, and/or reflected), as well as whether the screen 104 includes an absorptive background layer 108 or is a single patterned layer 106. The decision regarding the screen 104 characteristics is dependent on many different instances and is driven by the desired display appearance, environment, and hardware limitations.

Figure 5A:
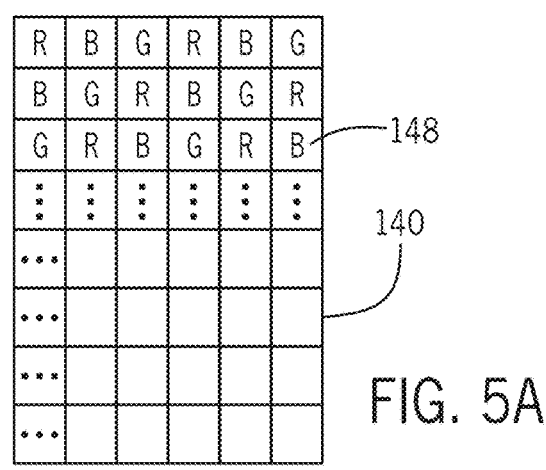
FIG. 5A is an front elevation view of an exemplary test pattern for use with the method of FIG. 4.

With reference to FIG. 5A, using the initial determinations, a sample or initial pattern 148 is printed on a test screen 140. The test pattern may include pattern elements 148 having a first orientation, geometric shape, and/or size and in instances where the pattern elements 148 include different colorants, the proportion of each colorant may be selected relative to the other colorants. In instances where the test pattern is printed by the printer 112 the test pattern may also include a printing resolution (e.g., number of dots per area), as well as any other modifiable characteristic. In some instances multiple test screens 140 may be created in order to provide additional data points, but the number of test screens 140 and the pattern characteristics may be varied as desired.

Figure 5B:
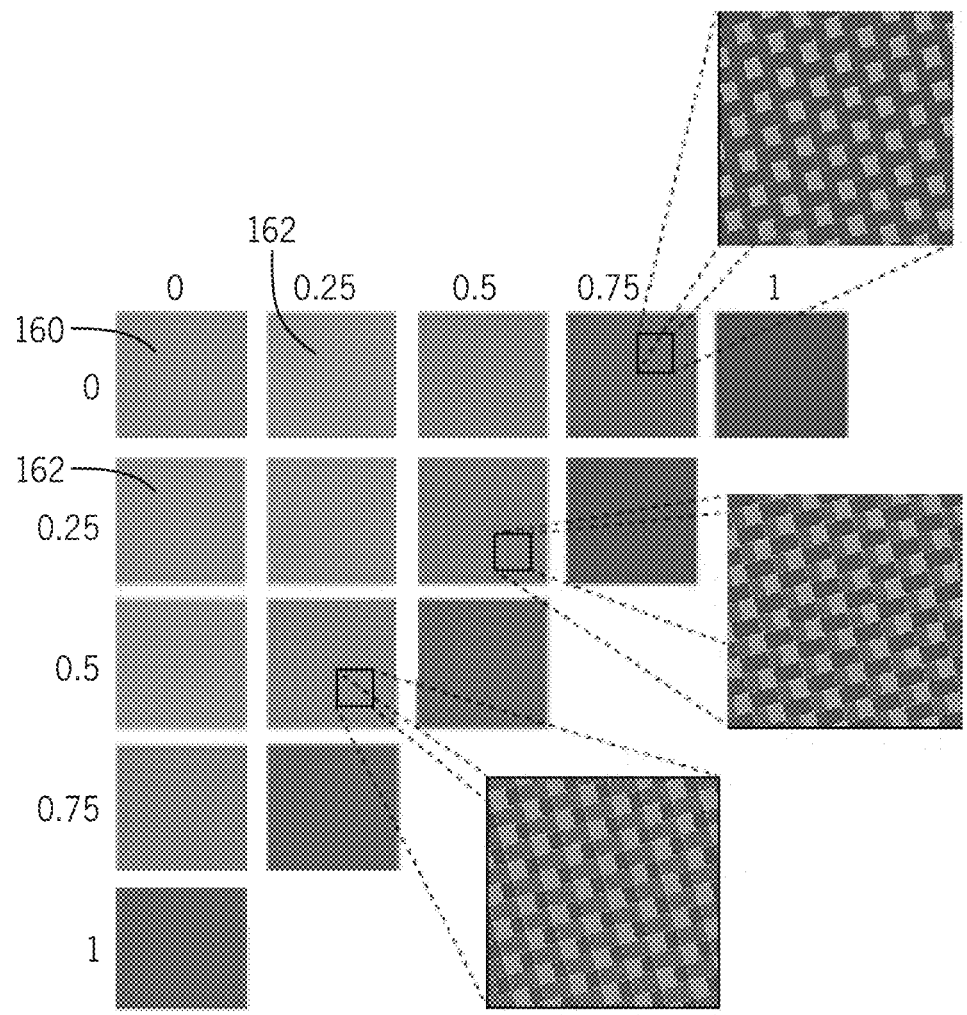
FIG. 5B is a chart illustrating a range of test patterns for use with the method of FIG. 4.

In one example, 15 test screens 140 having different patterns are created with different amounts of red, green, and blue emitting colorants and varying from 0 to 1 with a step of 0.25 to account for a number of possible combinations of the three primary colors to provide full coverage without overlapping. FIG. 5B illustrates the varying test images 148 printed with different ratios of colors, with an increase or decrease by 25% for each color between 0 to 100 percent. With reference to FIG. 5B, test pattern 160 includes 0 percent blue and 0 percent red, resulting in a pattern that is 100% green, test pattern 161 includes 25% red, 0% blue, resulting in a pattern that is 75% green, test pattern 162 is 25% blue, 0% red, and 75% green, and so on. The variation percentage for each test pattern can be varied as desired and a step of 25% is just one example. Other steps could be used, e.g., 30%, 40%, and the like. The use of smaller increments may result in more test images and thus a more accurate model, whereas larger increments reduces the number of test images, resulting in a less accurate model, but a faster testing process. That is, other sub-samples of the pigment surface space may be used that can establish a model predicting the emittance of each of the fluorescent inks as a function of the printed ink surface coverage.

The method 400 then proceeds to operation 406 and one or more test images of the test screen 140 with the test pattern 148 are captured by the camera 120. The test images are captured while the projector 110 is illuminating the screen 140 with the test or input image. In some instances, a separate test image is captured for each type of test pattern under full light. element individually. For example, using the registered projector pixel to pattern element determination from method 300, select pattern elements, e.g., all green elements, are illuminated and a test image is captured, and this is repeated for the remaining colorants.

Once the test images are captured, the method 400 proceeds to operation 408 and a model is created by the computer 102. The model may be generated in a similar manner as described in operation 308 in the method 300 and describes the display characteristics for the screen and the projector 110. In particular, the projector is geometrically registered to the test surface and the k-means algorithm is applied to cluster the individual projector pixels with pattern elements. Once the k means algorithm has been applied and the clusters determined, each cluster (e.g., all red elements, all green elements, etc.) are illuminated in turn by the projector (e.g., all red cluster elements illuminated, then green, etc.). The resulting illumination of each of the clusters allows the spectral reflectance of the printed UV pigments to be determined using a spectrophotometer or colorimeter, e.g., the spectral reflectance is captured by a spectrophotometer or the like. In many instances, as the individual printed pigment coverage areas increase, the corresponding visible colors corresponding to those pigments will also increase, resulting in brighter and more saturated colors. The spectral reflectance values are then used to describe the behavior of the projection surface.

Using the model, the method 400 proceeds to operation 410 and the model is interpolated on the computer 102 to fill in additional values for the system 100. For example, for a proposed ink surface coverage, the spectral reflectance values can be obtained by interpolating between the measured test images or patterns. Examples of interpolation algorithms that can be used are a Barycentric or Thin-Plate-Spline interpolation method. However, other algorithms can be used as well.

After the interpolation, the method 400 proceeds to operation 412 and the model is optimized. Substantially any type of optimization algorithm can be used, including a conjugate gradient, gradient descent, grid search optimization (or other brute force options), or the like. In one example the following optimization options include: maximizing printed area for each colorant, minimizing distance between each colorant, and/or maximizing the gamut value. In some instances, such as where a wide gamut is desired, this optimization characteristic may be selected for the model. For example, the following Equation can be used:

$$\{opt\_rgb_{rat}\} = \arg_{rgbrat} \max(\text{Volume}(\text{Gamut}(rgb_{rat}))) \quad \text{Eq. (7)}$$

In Eq. (7), $rgb_{rat}$ are two parameters defining the ratio between rgb fluorescent pigments, Gamut ($rgb_{rat}$) is the color gamut which can be achieved with the specified $rgb_{rat}$ ratio Volume (Gamut $rgb_{rat}$) is the volume of the deduced gamut and $opt\_rgb_{rat}$ are corresponding optimal rgb ratios that produce the largest color gamut. Optimizing this function for deducing the optimal ink surface ration for red, green, and blue fluorescent pigments can be carried out by a variety of methods, such as, but not limited to, gradient descent, conjugate gradient, grid search, and the like.

Using the optimization, the computer 102 can evaluate an input image and desired output image to determine an optimized pattern for the screen 104. The optimized pattern 104 may be varied depending on the pigments used, printing techniques, material, shape of the pattern elements, and the like. Using the optimized pattern information, an optimized pattern can be printed on the screen 104 for use with the display system 100.

Figure 6A:
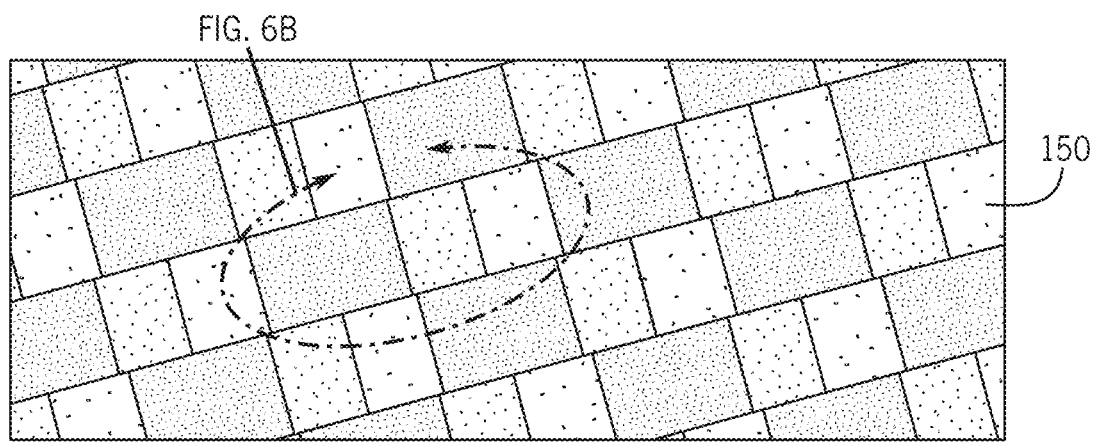
FIG. 6A is a front elevation view of a first example of an optimized pattern.
Figure 6B:
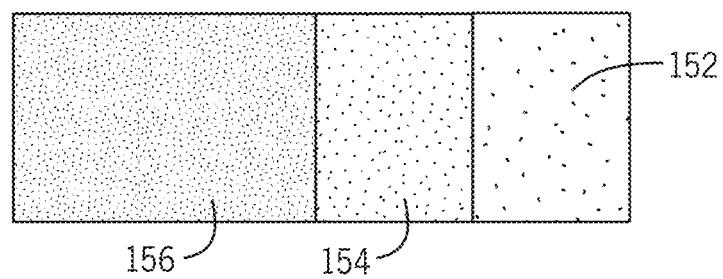
FIG. 6B is an enlarged view of the optimized pattern of FIG. 6A.
Figures 7A, 7B:
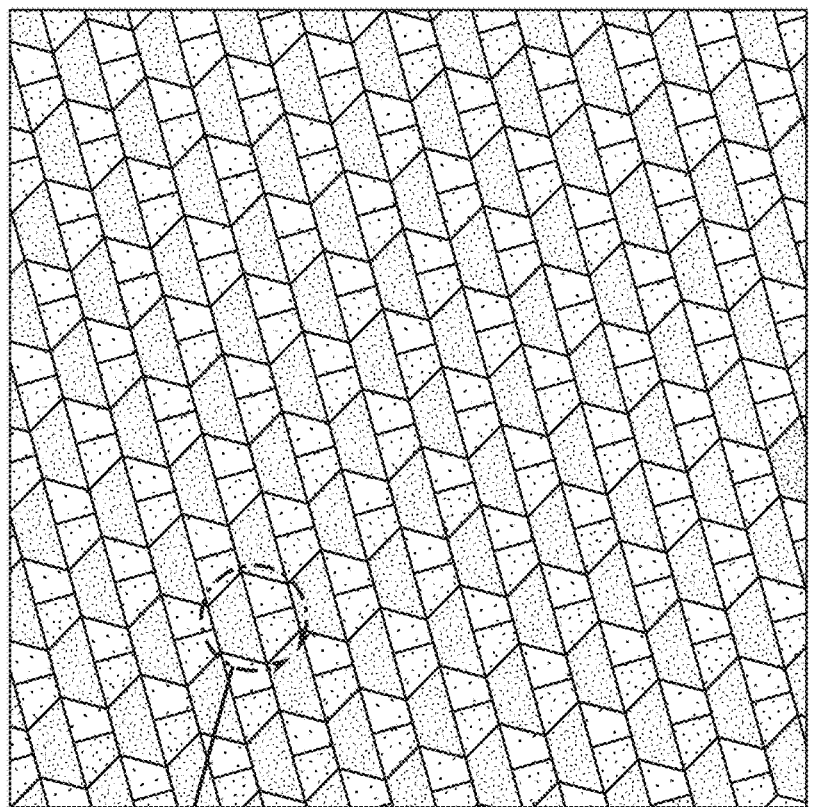
FIG. 7A is a front elevation view of a second example of an optimized pattern.
FIG. 7B is an enlarged view of the optimized pattern of FIG. 7A.
Figure 7B:
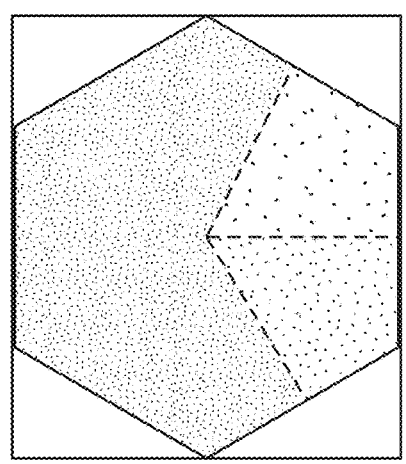
Figure 8A:
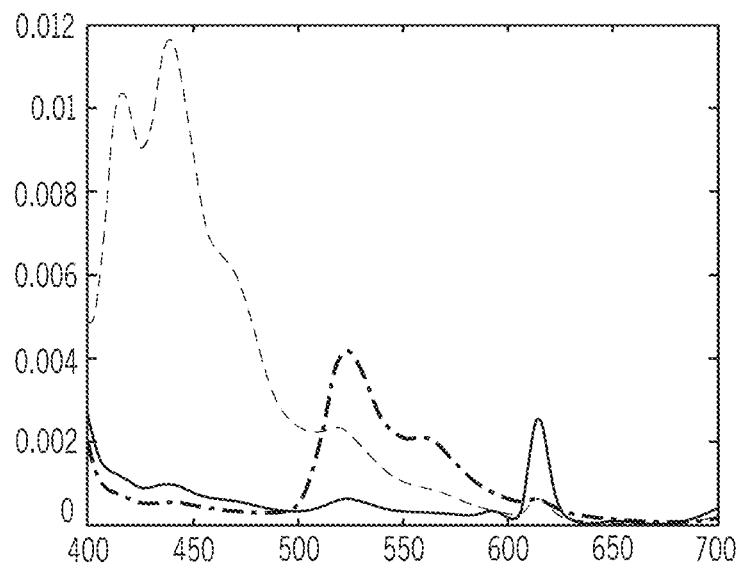
FIG. 8A is a graph illustrating a spectral emittance that defines a gamut range for a non-optimized pattern.
Figure 8B:
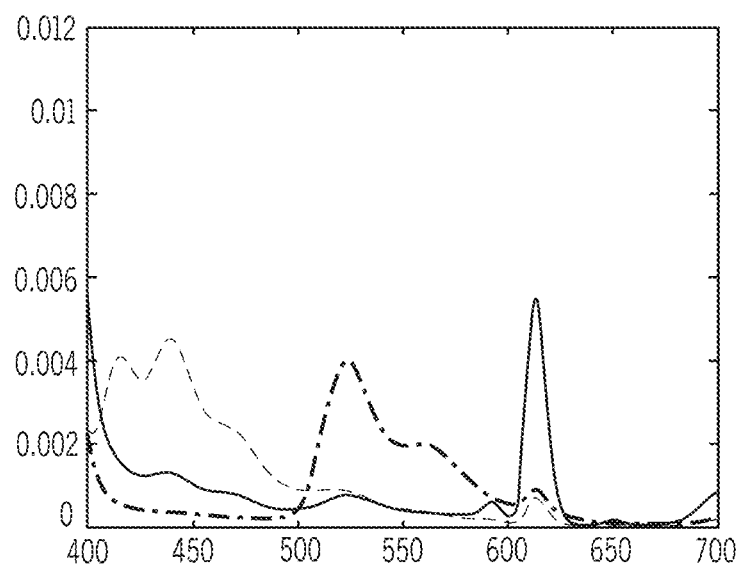
FIG. 8B is a graph illustrating a spectral emittance that defines a gamut range for the optimized pattern of FIG. 6A.

FIGS. 6A-7B illustrate examples of optimized patterns generated using the method 400. With reference to FIGS. 6A-6B, in this example, the optimized pattern 150 includes three colorant elements 152, 154, 156, which in one example, may be green 152, blue 154, and red 156. In this example, the colorants are printed in a rectangular shape and checkered across the screen 104. Additionally, the pattern 150 is rotated by 15 degrees relative to a longitudinal axis of the screen 104. With this pattern, the red colorant 156 is increased in proportion to the other two colorants by approximately 5 times as much. For example, in a pattern of 44×120 dots, 75 dots were red, 30 green, and 15 blue with proportions of 0.63, 0.25, and 0.12, respectively and it was found that the printing parameters for optimization were 720 dpi, perfect weave, a nozzle size of 5, VSD3, drop sizes of 2 for blue, 3 for red, and 1 for green. It was also found that the area defined by the points FIGS. 8A and 8B illustrate the spectra analysis for a rectangular test pattern as compared to the optimized rectangular test pattern of FIG. 6B. As shown by a comparison of the two graphs, in FIG. 8A, the gamut is reduced across all colorants, but largest with the blue colorant, but in FIG. 8B, the overall gamut is increased, increasing the red values, and decreasing the blue values. Resulting in a displayed image having a less "bluish" tint and more closely resembling the input image, therefore requiring less modification on the input image to achieve a desired appearance.

In some instances, the pattern of the printed elements on the screen 104 may visually detectable to a viewer and/or may result in a surface to circumference ratio that is less than optimal. For example, in the examples in FIGS. 6A and 6B, the pigments are arranged as rectangles that allow easy adjustment of the corresponding ratios, but result in a larger circumferential area for each color, which means that each projector pixel may hit multiple pattern "patches" (e.g., each rgb group of pattern elements or colors), rather than a single color element, increasing the amount of pixels exciting multiple pigment colors in parallel, which reduces the color gamut.

Varying tiling approaches using a varying geometric shape is used to provide color ratio variation with decreased circumference. FIGS. 7A and 7B illustrate another example of an optimized pattern using the method 400. In this example, the pattern elements were formed as hexagons, rather than rectangles, and each element was rotated by 15 degrees. The hexagons reduced space between the elements, while allowing an overall increase of a specific colorant, in one example, red. The pattern characteristics include VSD1, drop sizes of 1, 3, 1, for blue, red, and green, respectively with corresponding ratios of 0.75, 0.125, and 0.125, and halftoning at 0.9 for green and blue but 1.0 for red. In this example, the screen 104 can be divided into a hexagonal grid and each hexagon filled based on a desired color percentage. In this example, the visibility of each pattern element or fluorescent pigment is reduced as compared to the FIG. 6A-6B approach, even though the surface coverage remained the same. In short, the hexagonal pattern allows a similar gamut as other patterns, but with smaller "patches".

The above specification, examples, and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:

1. A method for utilizing a projector to generate one or more images on a screen, comprising:
    registering projector pixels emitted by the projector to the screen to determine a location of each projector pixel on the screen, wherein the screen comprises multiple pattern elements having at least two types of pattern elements;
    classifying the projector pixels based on the type of pattern element that the projector pixels illuminate;
    predicting an output color of an input image as projected on the screen by the projector based on the registration and classification of the projector pixels;
    utilizing the predicted output color of the input image, modifying at least one characteristic of the input image to generate a modified input image; and
    projecting the modified input image.

2. The method of claim 1, wherein
    the projector emits ultra violet light; and
    the pattern elements comprise fluorescent pigments including a first type that emits a first visible color, a second type that emits a second visible color, and a third type that emits a third visible color.

3. The method of claim 2, wherein the first type, the second type, and the third type cover different percentages of the screen from one another.

4. The method of claim 3, wherein the pattern elements are hexagonally shaped.

5. The method of claim 1, wherein screen comprises a transparent layer and an absorptive layer, wherein the pattern elements are printed on the transparent layer.

6. The method of claim 1, further comprising:
    illuminating the screen with a uniform light by the projector;
    capturing an illumination image of the illuminated screen with a camera; and
    warping the illumination image to a point of view of the projector for a select projector color channel to generate a nodal image indicating a correspondence between projector pixels and the pattern elements.

7. The method of claim 1, further comprising:
    utilizing the predicted output color of the input image, modifying at least one characteristic of the pattern elements of the screen.

8. A projection method to generate images, comprising:
    determining locations of projector pixels of light emitted from a projector onto a projection surface, the projection surface including a plurality of pattern elements;
    determining for the projector pixels a type of pattern element illuminated by the projector pixels;
    utilizing the locations of the projector pixels and the type of pattern element illuminated by the projector pixels to predict a display appearance of an input image as projected onto the projection surface by the projector;
    modifying the input image to generate a desired output image; and
    projecting the modified input image onto the projection surface.

9. The projection method of claim 8, wherein determining the type of pattern element illuminated by the projector comprises:
    capturing a test image of a structured light pattern projected onto the projection surface by the projector; and
    warping the test image to a point of view of the projector.

10. The projection method of claim 8, wherein determining the type of pattern element illuminated by the projector comprises determining a plurality of nodal images representing average values of pattern types illuminated by one or more of the projector pixels.

11. The projection method of claim 8, wherein determining locations of the projector pixels of light emitted from the projector comprises:
    projecting by the projector a plurality of structured light patterns onto the projection screen;
    capturing by a camera a plurality of pattern images of the plurality of structured light patterns as projected onto the projection screen; and
    mapping pixels of the plurality of pattern images to the projector pixels.

12. The projection method of claim 8, wherein the plurality of pattern elements comprise a first color pattern element, a second color pattern element, and a third color pattern element, wherein the first color pattern element, the second color pattern element, and the third color pattern element encompass different areas on the projection surface from one another.

* * * * *